INVENTOR.
MICHAEL S. SHILLER

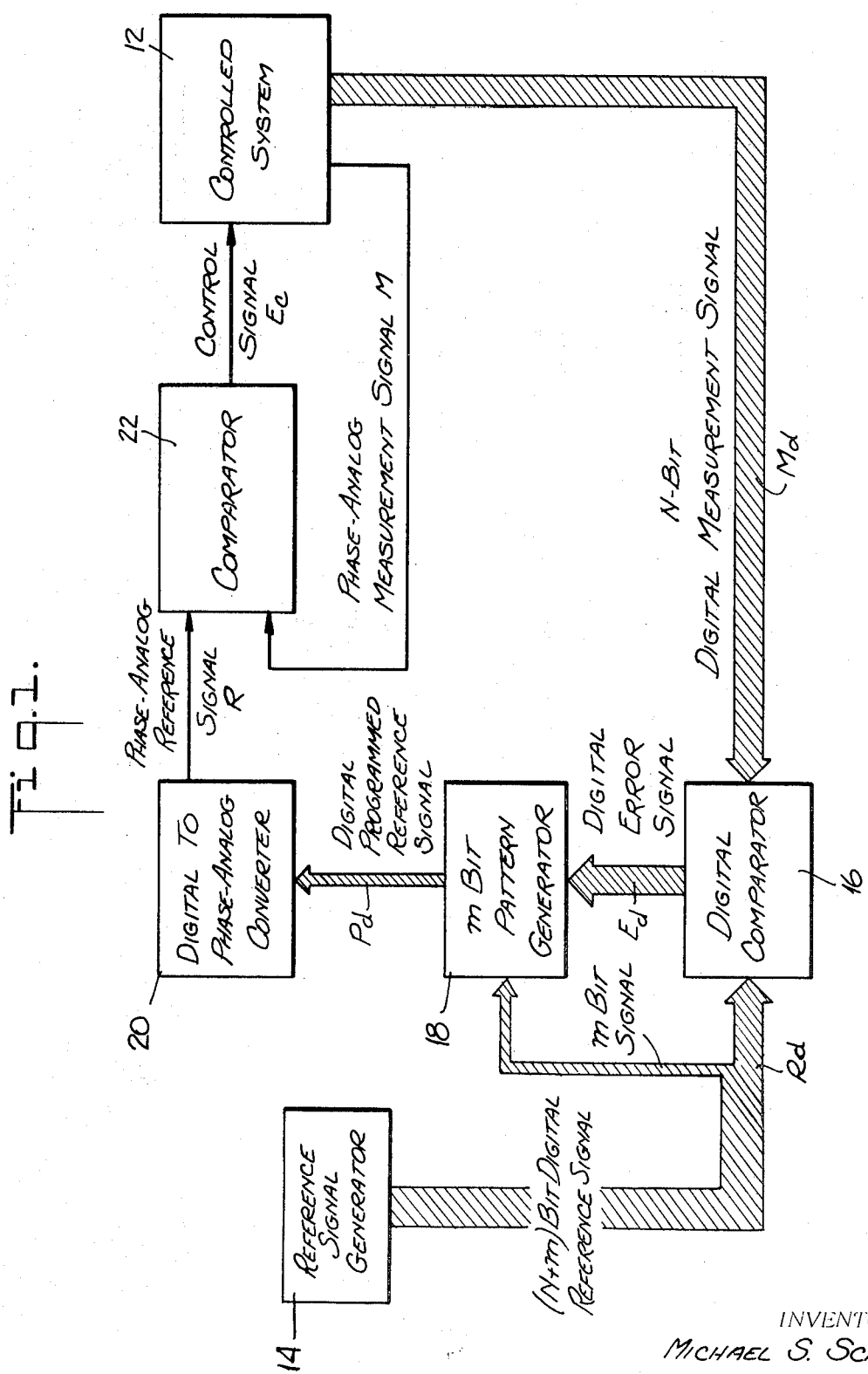

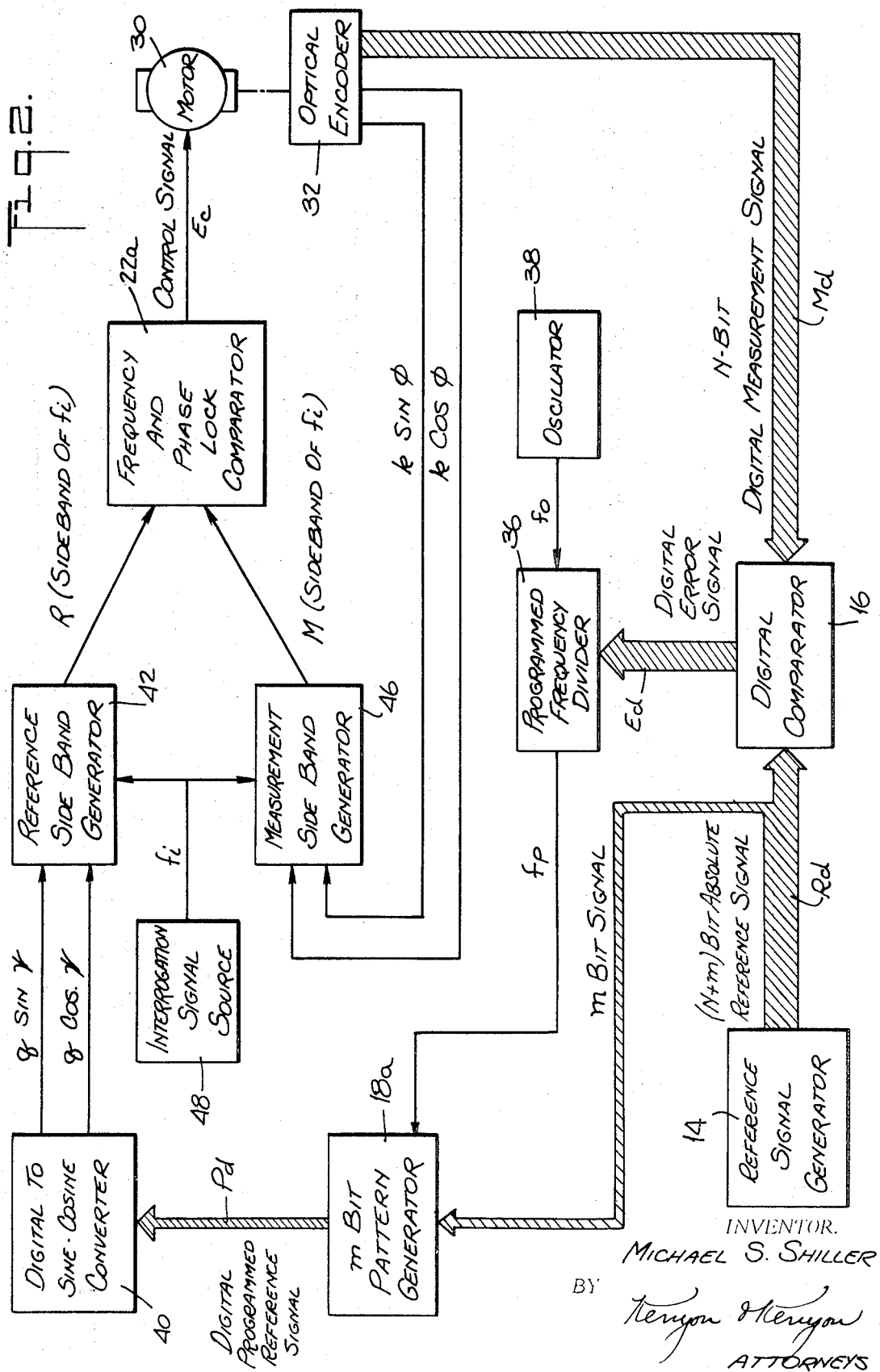

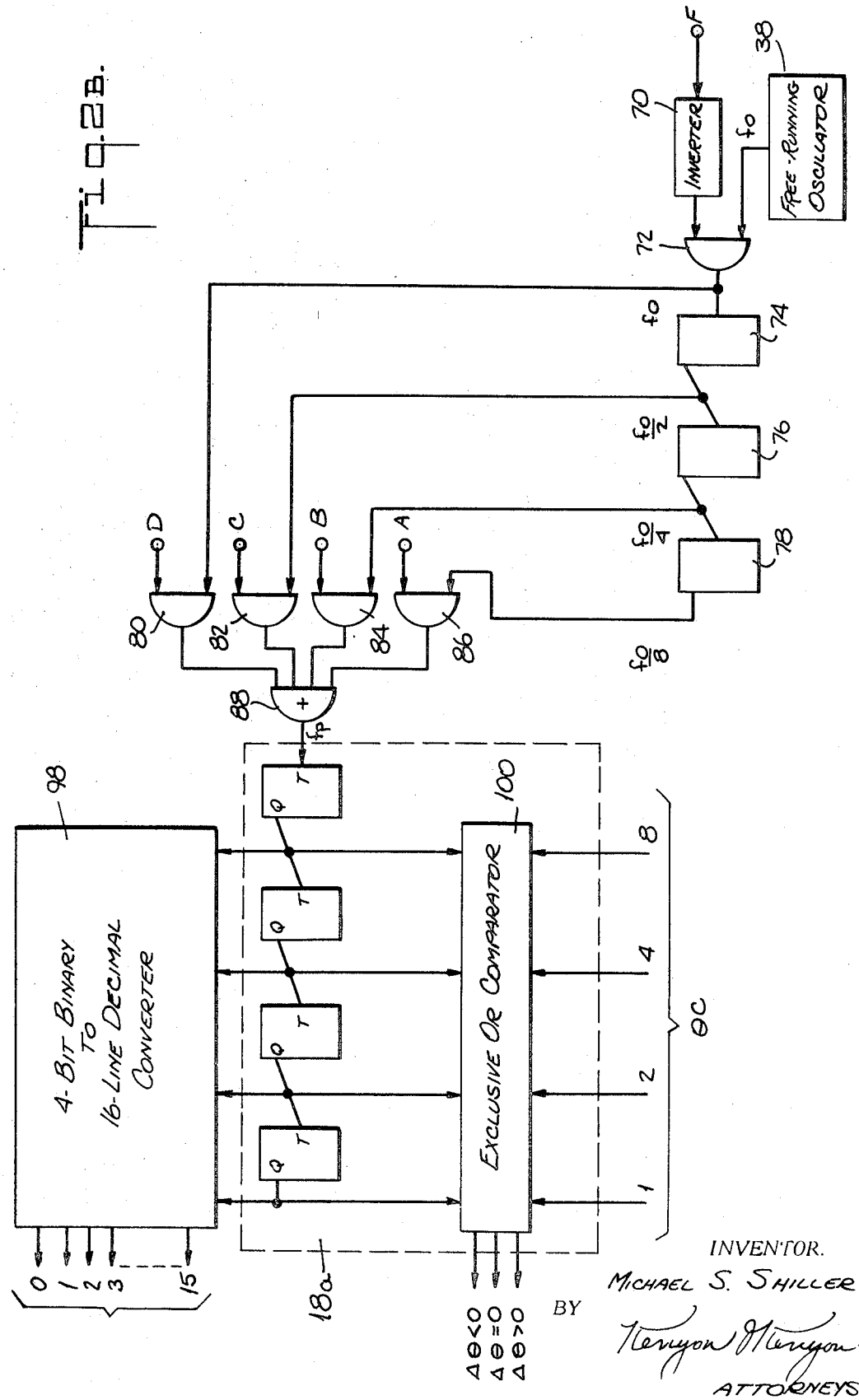

United States Patent Office 3,548,282
Patented Dec. 15, 1970

3,548,282
CONTROL SYSTEM FOR MOTOR VELOCITY AND POSITION
Michael S. Schiller, New York, N.Y., assignor, by mesne assignments, to Security Trust Company of Rochester (trustee), Rochester, N.Y., a banking corporation of New York
Filed Jan. 27, 1969, Ser. No. 794,084
Int. Cl. G05b *19/26*
U.S. Cl. 318—18              17 Claims

ABSTRACT OF THE DISCLOSURE

There is disclosed a system for controlling a parameter, such as a motor shaft angle position, which is capable as representation as a phase and frequency of an electrical signal. A whole word digital reference signal is compared with a whole word digital shaft angle measurement signal, which latter signal is derived from an absolute encoder coupled to the shaft of the motor being controlled. The comparison of this digital reference signal and digital measurement signal provides a digital error signal. The digital error signal is used to bring the shaft of the motor to exactly the position commanded by the whole word digital reference signal. In order to avoid overshoot, a velocity profile is determined as a function of the magnitude of the digital error signal.

---

The invention relates in general to an electrical control system and more particularly to a control system to provide absolute digital control over the stationary position of a rotary device such as a motor and means for commanding a velocity profile for moving from one stationary point to another point.

BACKGROUND OF THE INVENTION

The invention is a device for controlling some parameter of a controlled system which is capable of representation as a signal phase and frequency. In most of the contemplated applications of the device, the phase and frequency measurement parameters will represent or correspond to position and speed operational parameters and the embodiments described herein will be of such an application. It should be remembered, however, that the application of this invention may extend to the control of any parameter which can be measured by virtue of the phase and frequency values of a measurement signal.

Prior art control systems, responsive to phase and frequency, to control position and speed are known. In general, the developments in this control art relate to techniques to achieve greater accuracy and resolution.

Two general types of control systems have been used. One is the true analog system. The true analog system employs a continuous measurement signal of the parameter being controlled. For example, a continuous sinusoidal signal derived from a feedback potentiometer excited by a D.C. signal will represent motor shaft angle position. Each posiiton of the motor shaft will dictate a particular measurement signal value. The measurement signal resolution can thus be considered infinite. The known true analog systems have the disadvantage of limited accuracy. The factors leading to inaccuracy are well known and include the nature of the read out transducers available.

Accordingly, it is a major purpose of this invention to provide a control system that has improved control accuracy.

It is a more specific purpose of this invention to provide a control system that is adapted to accurately control the shaft angle position of a motor at zero rotational speed.

The other chief known type of control system is the digital system. In this type of system, the parameter measurement signal is carried by a number of lines $n$, each line capable of representing a zero or a one. This type of signal can assume only $2^n$ states. Thus, each value of the digital signal represents a range of parameter values. For example, a fourteen (14) bit optical encoder on the shaft of a motor being controlled will provide $2^{14}$ (that is 16,384) digital values. Each digital value will represent an angular arc of shaft position range equal to 360° divided by 16,384. This means a digital measurement resolution of 79.10 arc seconds.

The known digital control systems have various disadvantages. The existence of a quantized analog error signal, derived from the digital error signal, produces a "steady-state" cycling about the position to which it is desired to control the system. This cycling is known as limit-cycling. The response to error or to change in reference results in a power input that tends to cause the motor being controlled to overshoot several times before "stabilizing" into the "steady-state" limit cycling mode. Further, sudden large changes in reference or in load result in full acceleration of the motor which imposes forces that may damage or render inoperative the mechanism under control.

Accordingly, it is another major purpose of this invention to provide a shaft angle control system in which the advantages of digital control are provided without producing a limit-cycling characteristic.

It is a further purpose of this invention to provide such a digital control system in which overshooting is avoided.

It is a yet further object of this invention to provide such a digital control system in which sudden changes in reference command do not impose sudden full acceleration on the system.

BRIEF DESCRIPTION OF THE INVENTION

The embodiments of the invention described herein employ a phase-analog loop as part of the control system to achieve the above objects. The inputs to the comparator unit of the phase-analog loop are thus termed herein "phase-analog" signals in order to indicate their function. They are not, however, the type of true analog signal as would be developed by the potentiometer mentioned above in connection with a true analog control system. These "phase-analog" signals are actually a train of pulses. The pulse repetition rate of the pulses in the pulse train is the frequency of these phase-analog signals. Thus, as to the phase-analog measurement signal, the time position of the pulses represents motor shaft angle position. Accordingly, a shift in motor shaft angle position will result in a time shift of the pulses. The embodiments illustrated are instrumented so that at zero shaft rotational speed the phase analog signal derived from the shaft has a predetermined frequency (pulse repetition rate). In such case, the frequency deviation from the predetermined frequency represents motor shaft rotational velocity. It shall be understood herein that the reference to a signal as a "phase-analog" signal shall be to a signal, be it a reference signal or a measurement signal, which is a pulse train whose pulse repetition rate is its frequency and whose pulse repetition is its phase.

Briefly, the invention is a system for controlling a parameter of a controlled system, which parameter is capable of representation as a phase and frequency of an electric signal. The parameter involved, such as motor shaft angle position, is measured in both digital form and phase-analog form.

The digital measurement signal and a digital reference signal are compared to provide a digital error signal.

An m bit (conveniently, four bit) pattern generator converts the digital error signal to a cycling four bit digital reference signal. A digital to analog converter converts the cycling digital reference to a phase-analog reference signal. The magnitude of the digital error signal controls the rate at which the pattern generator output cycles through its pattern. Thus, the frequency of the phase-analog reference signal is a function of the magnitude of the digital error signal. Because the frequency of the phase-analog reference signal is made a function of the magnitude of the digital error signal, the rotational speed of the motor is made a function of the digital error signal. Accordingly, as the magnitude of the digital error signal decreases, the rotational speed of the motor decreases and the motor is brought to its commanded position in as fast a manner as is possible without causing overshoot.

The pattern generator is so programmed that when the digital error signal becomes zero, the pattern generator continues to cycle through its programmed cycle until it reaches a predetermined output state representing and determining a predetermined phase for the phase-analog reference signal.

The phase analog reference signal is compared with the phase-analog measurement signal to provide a control signal having an average magnitude that is a function of the phase difference between the two signals being compared.

The digital measurement signal has an N bit resolution and the digital reference signal has at least an N bit resolution. As long as the digital measurement signal and digital reference signal differ in value, a digital error signal will be generated as the basis for providing a control signal to bring the motor shaft angle position to the value commanded by the digital reference signal. Thus, the digital reference signal provides absolute control over shaft position up to the N bit resolution. Further control within the least significant bit of the N bit measurement signal may be obtained by the use of additional reference signal bits to control the final output state of the pattern generator. Thus an $(N+m)$ bit digital reference signal may be employed to provide $(N+m)$ bit resolution even though the digital measurement signal is a N bit signal.

BRIEF DESCRIPTION OF THE DRAWINGS

Other objects and purposes of the invention will become apparent from the following detailed description and drawings in which:

FIG. 1 is a simplified block diagram of this invention;
FIG. 2 is an expanded block diagram of the FIG. 1 embodiment; and
FIGS. 2A, 2B and 2C are block and schematic diagrams showing in greater detail the logic circuitry involved in the digital comparator, frequency divider, and pattern generator units of FIG. 2.

DESCRIPTION OF THE PREFERRED EMBODIMENTS

FIG. 1 embodiment

Figure 2A:
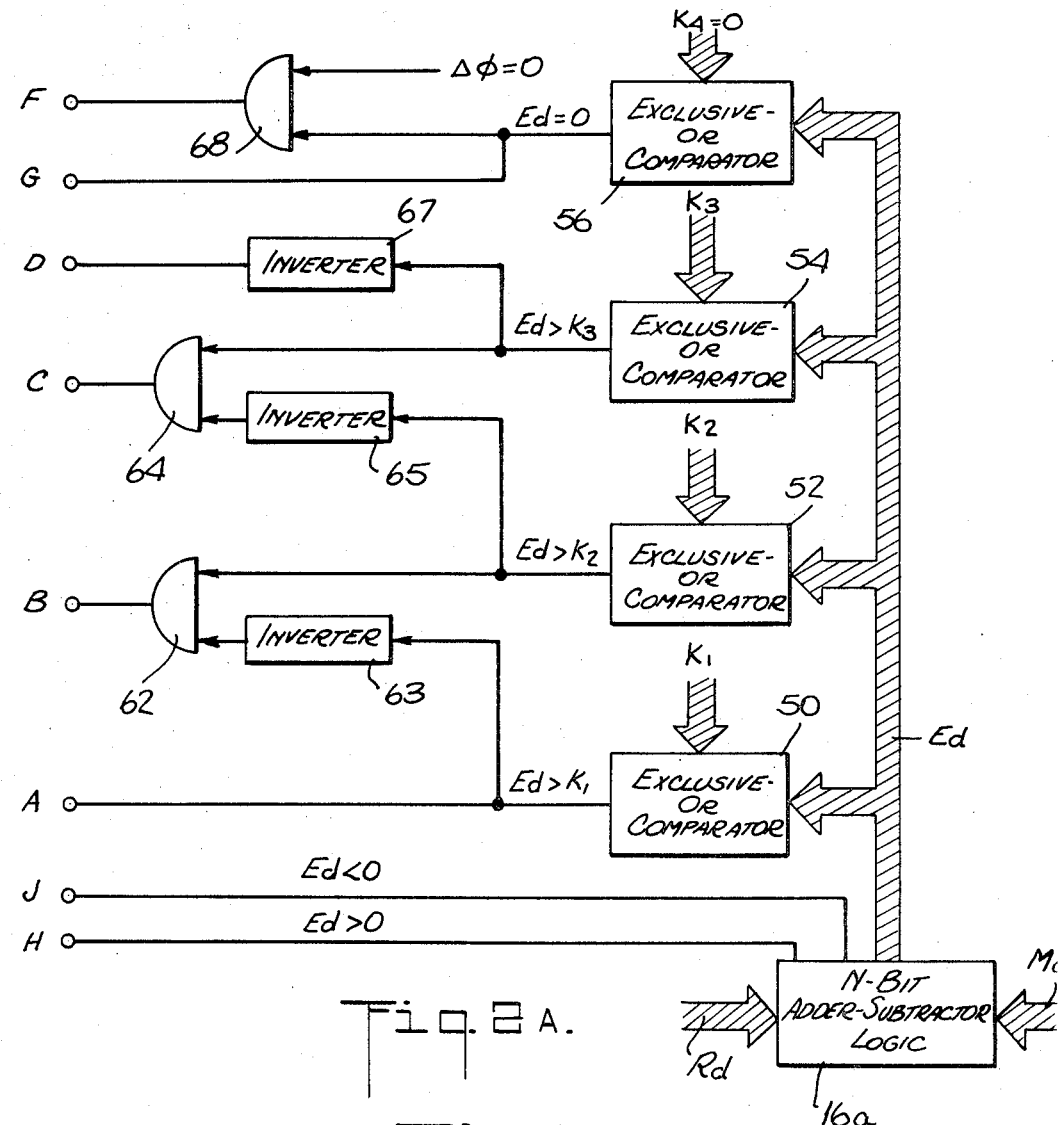

FIG. 1 is a simplified block diagram indicating the basic control system of this invention. The system that is to be controlled is indicated as the controlled system 12 and provides two measurement signal outputs, specifically a phase-analog measurement signal M and a digital measurement signal $M_d$. These two measurement signals M and $M_d$ are phase-analog and digital measurements respectively of the parameter being controlled.

Thus both measurement signals represent the same parameter. In the case of the control of the shaft angle of a motor, these two measurement signals represent shaft angle position and shaft rotational speed. At this point it should be noted that for ease of comprehension it will be presumed in the following discussion that motor shaft angle position is the parameter being controlled and that the motor shaft is being controlled to zero speed.

A reference signal generator 14, which may be a computer, provides a $(N+m)$ bit digital whole word reference signal $R_d$ to command absolute motor shaft angle position.

The digital measurement signal $M_d$ is a simultaneous (whole word) multi-bit digital signal representing actual shaft angle position. The value of the first N bits of the multi-bit digital reference signal $R_d$ corresponds to the value $M_d$ will have when the motor shaft is at the position being commanded. In general, the number of bits in the digital reference signal $R_d$ will be equal to or greater than the number of bits in the digital measurement signal $M_d$ so that the full resolution of the measurement signal $M_d$ can be employed. The number of bits in the measurement signal $M_d$ may be as high as the state of the art permits and the application requires. In a high resolution system, the number of bits may be in the range of twelve to nineteen.

Since a simultaneous multi-bit signal requires as many lines as there are bits to carry the signal from one unit to the next, a wide flow line convention is employed in the figures as a suggestive illustration of when the signal is a simultaneous multibit signal such as are the digital measurement signal $M_d$, digital reference signal $R_d$, and digital error signal $E_d$.

The first N bits of the digital reference signal $R_d$ are compared against the N bit measurement signal $M_d$ in a digital comparator 16 to provide a simultaneous multi-bit digital error signal $E_d$. When the motor shaft has been brought to the position commanded by the first N bits of the digital reference signal $R_d$, the first N bits of the reference signal $R_d$ and the N bits of the measurement signal $M_d$ will match and the digital error signal $E_d$ will have a zero value.

A "$m$" bit pattern generator 18 is provided to supply a simultaneous multi-bit output $P_d$. The pattern generator 18 conveniently (but not necessarily) has a four bit output. The pattern generator 18 is designed and programmed to respond to the digital error signal $E_d$ to provide a four bit output which cycles through a predetermined pattern of sixteen ($2^m$) output states. Accordingly, the pattern generator 18 output $P_d$ is designated herein as a programmed digital reference signal $P_d$. The rate at which the pattern generator 18 output $P_d$ cycles through the programmed pattern of outputs is a function of the magnitude of the digital error signal $E_d$. The greater the error signal $E_d$, the faster will the pattern generator ouput $P_d$ cycle.

The relationship of the values of the sequential patterns that the pattern generator 18 is programmed to provide as an output $P_d$ are converted to analog values representing sixteen spaced sequential points on a sinusoidal curve. The phase-analog converter 20 performs this function of converting the digital programmed reference signal $P_d$ into a phase-analog reference signal R. The phase-analog reference signal R has a frequency that is a function of the rate at which the pattern generator 18 output $P_d$ cycles through its predetermined pattern and an instantaneous phase that is a function of the instantaneous pattern of the pattern generator 18 output.

Consequently, the frequency of the phase-analog reference signal R is a function of the magnitude of the digital error signal $E_d$. But the pattern generator 18 may be programmed so that the rate at which its output $P_d$ cycles is a non-linear function of the digital error signal $E_d$. Because of this programming of the response of the pattern generator 18 to changing digital error signal $E_d$, the frequency of the phase-analog reference signal R goes to zero in a controlled fashion. Accordingly, the velocity of the motor 30 is similarly controlled and overshoot can be avoided.

When the digital error signal $E_d$ is brought to a zero value by means of the operation of this system, the pattern generator 18 is programmed to respond in a particular fashion to this zero digital error status. The pattern generator 18 responds to zero digital error status by continuing to cycle through its programmed cycle until it comes to the determined output value commanded by the last $m$ bits of the $(N+m)$ bit reference signal $R_d$. Thus, the phase of the phase analog reference signal R is predetermined for a zero digital error status. In addition, the phase-analog reference signal R goes to that predetermined phase value in a regular pattern thereby avoiding sudden phase changes of magnitudes greater than successive pattern generator output states. In this fashion, the attainment of the final phase value of the phase-analog reference signal R is achieved in as smooth and continuous a fashion as the sequence of pattern generator outputs will permit. An important point here is that the pattern generator 18 does not respond to zero digital error status by jumping to the predetermined phase value. Rather, the generator 18 continues to cycle through its series of states until the predetermined phase value is achieved.

Thus, it may be seen that when the digital error signal $E_d$ becomes zero, the phase analog reference signal R will command a particular shaft angle position within the least significant bit of the digital measurement signal $M_d$.

The phase-analog reference input R and phase-analog measurement signal M are compared in a comparator 22 to provide the control signal $E_d$ that determines shaft angle velocity and position. A preferred form of the comparator 22 is disclosed in my co-pending application, Comparator Circuit, Serial No. 677,834, filed Oct. 13, 1967.

The programming of a predetermined value for the pattern generator 18 output $P_d$ when the error signal $E_d$ goes to zero provides a predetermined phase-analog reference signal R when the shaft is at the position commanded by the digital reference $R_d$. This makes possible the use of the comparator 22 to compare the phase-analog measurement signal M with the predetermined value of R to drive the shaft to the position commanded and then hold the shaft against perturbations, for example, at the position commanded.

Because the digital measurement signal $M_d$ and digital reference signal $R_d$ are whole word, multi-bit digital signals, they provide a means to achieve absolute command over the position of the motor shaft. Specifically, this means that the digital reference signal $R_d$ can command the motor shaft to any desired position within the 360° of shaft rotation. The input command resolution is determined by the number of bits of the digital reference signal $R_d$.

The FIG. 1 system, therefore, provides a means to obtain absolute control to the full resolution available with a digital measurement device (that is, 100 percent accuracy at N bit resolution). It further provides an ability to employ a phase-analog measurement signal M to obtain essentially infinite control resolution to compensate for shaft perturbations.

The combination of digital command and phase-analog control is made available because of the digital to phase-analog converter 20, which provides a phase-analog reference signal R (derived from the digital error signal $E_d$) for comparison with the phase-analog measurement signal M.

Furthermore, by programming the cycling of the pattern generator 18 as a function of digital error signal $E_d$ magnitude, the motor shaft is brought to the desired position by a controlled velocity profile that avoids overshooting.

The FIG. 2 embodiment

The FIG. 2 embodiment is basically the same as the FIG. 1 embodiment except that FIG. 2 illustrates certain preferred implementations of the pattern generator 18, the digital to phase-analog converter 20 and the measurement signal read out equipment in the controlled system 12.

In particular, FIG. 2 illustrates the FIG. 1 pattern generator 18 as comprising a pattern generator 18a, a programmed frequency divider 36 and an oscillator 38. In addition, FIG. 2 shows the digital to phase-analog converter 20 of FIG. 1 to comprise a digital to sine-cosine converter 40 and a reference side band generator 42. FIG. 2 specifically designates the FIG. 1 comparator 22 as a frequency and phase lock comparator 22a. FIG. 2 illustrates the controlled system 12 as a motor to the shaft of which is coupled an optical encoder 32 and including a means (the measurement side band generator 46) to convert the optical encoder 32 sinusoidal output to the phase-analog measurement signal M.

The FIG. 2 embodiment is conveniently described in connection with the control of the position of the shaft of a motor 30. Motor 30 shaft position is forced to track the output $R_d$ of the digital reference signal generator 14 as described in connection with FIG. 1. The absolute position of the motor shaft is measured by a multi-track optical encoder 32. The encoder 32 has "N" tracks and thus provides a "N" bit measurement signal $M_d$. N bits of the digital signals $R_d$ and $M_d$ are compared in the comparator 16 to provide the simultaneous multi-bit digital error signal $E_d$. For the purpose of discussion of FIG. 2 assume that the digital reference signal $R_d$ has $(N+4)$ bits, the four bits being used to control the final position of the pattern generator 18a.

As shown in FIG. 2, an oscillator 38 provides a frequency input $f_o$ (of, for example, 20 kHz.) for a programmed frequency divider 36. The programmed frequency divider 36 is a frequency divider network that operates as a frequency divider on the input frequency $f_o$ and is responsive to the value of the digital error signal $E_d$ to provide an output frequency $f_p$ that is a function of the magnitude of the digital error signal $E_d$ input. The divider network 36 is generally programmed so that the greater the absolute magnitude of the digital error signal $E_d$ the greater will be the frequency of the divider network 36 output $f_p$. However, the program will generally provide a non-linear relationship between the programmed frequency $f_p$ and the digital error $E_d$.

In this fashion, a programmed velocity profile may be provided so that the speed with which the control system causes the motor 30 to move from one shaft angle position to another may be made a predetermined function of the magnitude of the position change being commanded. For example, for large positional changes the profile will be programmed to initially cause the system to run no faster than the saturation velocity of the motor under load conditions and to reduce velocity as the error decreases. The primary reasons for providing such a programmed velocity profile is to avoid overshoot. It is preferable that the frequency divider 36 be adjustable so that the velocity profile can be modified to fit the dynamics of the system being controlled.

In order to maintain control over motor perturbations, it is necessary that the response to a command be kept to a velocity less than the saturation velocity of the motor under whatever load the motor has. Thus, as a general rule the frequency divider 36 is programmed so that when the digital error signal $E_d$ exceeds a certain maximum value, the maximum programmed frequency $f_p$ will be provided. The maximum programmed frequency $f_p$ is selected such that it commands a response no greater than the saturation velocity of the motor under its load.

As described in connection with FIG. 1, the $m$ bit pattern generator 18a is designed to generate a sequence of simultaneous multi-bit digital signals. It has been found useful and convenient to have a four bit simultaneous output $P_d$ from this pattern generator 18a. The four bit output cycles through sixteen permutations, each one of the sixteen four bit values representing a separate point on a sine wave. The digital to sine-cosine converter 40 converts each of these pattern generator 18 digital outputs to a corresponding analog signal representing the amplitude of the corresponding portion of the sine wave. A digital to sine-cosine converter that may be employed to perform this function is disclosed in FIG. 7 of my co-pending application, Control System, Ser. No. 729,846 now Pat. No. 3,462,663 filed Feb. 29, 1968.

The output of the digital to sine-cosine converter 40 are two separate, quantized analog signals, $q \sin \Psi$ and $q \cos \Psi$. These two converter 40 output signals are identical to one another except that they are displaced in phase by 90°. As described in connection with my co-pending application Ser. No. 729,846, now Pat. No. 3,462,663 the employment of a dual reference signal in quadrature and a dual measurement signal ($k \sin \phi$, $k \cos \phi$) in quadrature is preferable in order to facilitate the generation of the phase-analog signals R and M as side bands of an interrogating signal $f_i$.

It might be noted at this point that the converter 40 and side band generator 42 serve the function of providing the phase-analog reference signal R as a side band of some interrogating frequency $f_i$. This function can be achieved by other means. For example, a digital shift register used as a delay line may be employed to generate the required reference signal R.

The rate at which this four bit programmed reference signal $P_d$ from the pattern generator 18$a$ cycles through its sixteen sequence pattern is a function of the frequency of the input signal $f_p$ (when $E_d$ is other than zero). In the embodiment shown, the higher the input frequency $f_p$, the faster will the pattern generator 18$a$ cycle through its sequence.

When the digital error signal $E_d$ goes to zero, the pattern generator 18$a$ responds to such an indication of zero error status by ignoring the frequency divider 36 output $f_p$ and continuing to cycle until it reaches the output state commanded by the last four bits of the ($N+4$) bit digital reference signal $R_d$. In this fashion, a phase-analog reference signal R is provided that tends to bring the motor 30 to a predetermined position within the least significant bit of the N bit digital measurement signal $M_d$.

This FIG. 2 embodiment employs in part the techniques of frequency and phase comparison disclosed in my above referenced application, Ser. No. 729,846, now Pat. No. 3,462,663. As disclosed therein, an upper side band R obtained by modulating an interrogation signal with a reference input signal is compared with an upper side band M obtained by modulating the same interrogation signal with a shaft position measurement signal. Lower side bands can be used in lieu of upper side bands. One side band or the other, but not both, may be used in any design.

Similarly, herein, an interrogation signal source 48 provides an interrogation signal having a frequency $f_i$. This frequency $f_i$ is applied to both the reference side band generator 42 and to the measurement side band generator 46, both of which generators 42 and 46 are single side band generators. Side band generators 42 and 46 may be of the type illustrated in FIG. 2 of my above-noted application, Serial No. 729,846, now patent number 3,462,663. Each side band generator 42, 46 translates an input analog information signal in quadrature into a single side band of the interrogation signal frequency $f_i$. The mode of generation is one that provides a pulse output at each positive-going, zero cross over of the continuous side band signal. Thus the side band generators 42 and 46 provide phase-analog outputs R and M that are displaced in frequency and phase from the carrier frequency $f_i$ by the differences in frequency and phase between the respective input signals to the side band generators and the interrogation signal.

These two phase-analog signals, R and M, are then fed to frequency and phase lock comparator 22$a$. When the phase-analog inputs R and M to comparator 22$a$ differ in phase and/or frequency, comparator 44 provides control signal $E_c$ which controls power to the motor 30. This controls the shaft position in such a fashion as to bring M to the same frequency as R and, in cases where there is no static load on the motor, to cause the phase of M to equal that of R.

To avoid overshoot, it is important that the control signal $E_c$ be developed in a fashion such that the average magnitude of the control signal $E_c$ decreases as the phase-analog measurement signal M more nearly approaches the phase-analog reference signal R. A preferred comparator 22$a$ is disclosed in my co-pending application, Comparator Circuit, Serial No. 677,834 filed Oct. 12, 1967.

As long as the digital measurement signal $M_d$ differs from the first N bits of the digital reference signal $R_d$, there will be a digital error signal $E_d$ which will cause cycling of the pattern generator 18 output $P_d$. This will generate a phase analog reference signal R that differs in phase from the phase analog measurement signal M by an amount sufficient to provide a control signal $E_c$ that will force the motor 30 into lock with the digital reference signal $R_d$. Thus this invention provides an absolute digital command. Specifically, this means that the motor shaft will be brought to a commanded position with the resolution of the least significant bit of the N bit digital measurement signal $M_d$.

Signals $M_d$ and $R_d$ are both digital. When they become equal, i.e., assume identical states over the N most significant bits. This "equality" can indicate with certainty that the two signals represent values of the controlled parameter which differ by an increment no greater than that increment defined by the least significant bit of the N bit digital measurement signal $M_d$.

After $E_d$ has thus been brought to a zero value, the last four bits of the digital reference $R_d$ cause the pattern generator 18$a$ to cycle to a commanded steady state and thus provide further command over shaft angle position. In this fashion command resolution can be achieved to the least significant bit of the ($N+4$) bit digital reference $R_d$. Because of the employment of the phase-analog measurement signal M derived from a continuous optical encoder output, the control resolution of the system is essentially infinite.

It makes no sense to provide resolution greater than the accuracy that can be obtained. Thus, it is important that the encoder track which provides the phase-analog measurement signal M be aligned with the encoder tracks that provide the digital measurement signal $M_d$ to an accuracy at least equal to the ($N+4$) bit input command resolution.

With an understanding of the operation of the FIG. 2 system described above, it may be seen that a technique is provided for establishing a digital command resolution greater than the digital measurement resolution required. In other words for a given N bit digital measurement resolution (represented by the digital measurement signal $M_d$), the command resolution provided is ($N+m$) bits.

In a purely analog system it is not always possible to ascertain with any certainty that the state of the controlled parameter lies within any particular bounds. In the system of this invention, however, the command resolution can be determined to the least significant bit of the digital reference signal $R_d$. At the same time, because of the employment of the analog measurement signal M, the control resolution (for controlling perturbation) is infinite.

The logic circuitry

Figure 2C:
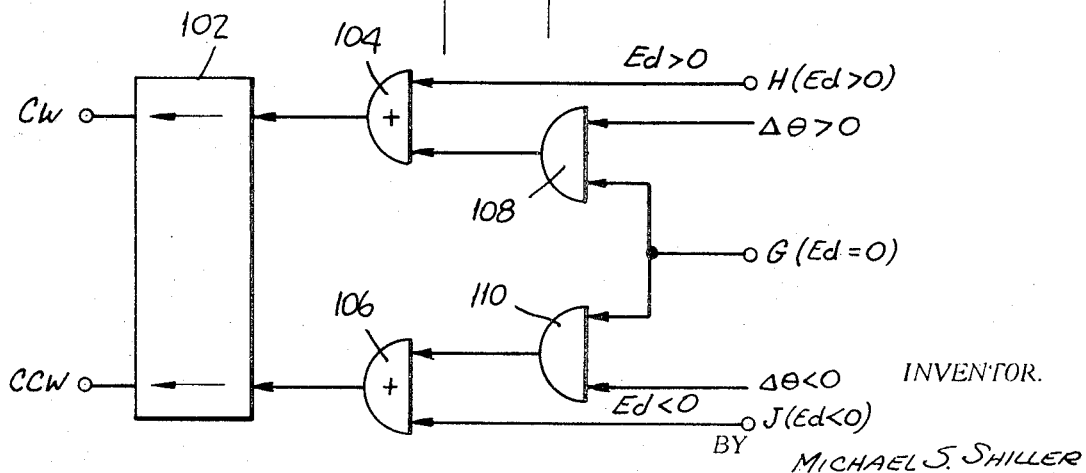

FIGS. 2A, 2B and 2C illustrate in somewhat greater detail the logic circuitry involved, in one embodiment, in the programmed frequency divider 36 and pattern generator 18$a$.

The comparator 16 is specifically designated in FIG. 2A as a N-bit adder-subtractor 16$a$, which compares the two whole word input digital signals $M_d$, $R_d$ to provide a whole word digital error signal output $E_d$.

It might be appropriate here to note that the digital reference $R_d$ is shown as a simultaneous multi-bit digital signal because that is what would be applied to the adder-subtracter comparator 16a. The ultimate source (such as a computer) of the digital reference $R_d$ could, however, produce the signal as a serial signal rather than in parallel. In such case, a serial to parallel converter and storage unit would be included between the comparator 16 and the source of the digital command $R_d$. Whether the computer supplied the digital reference $R_d$ in serial or parallel fashion, there would normally be a storage register (not shown) between the computer and the adder-subtracter 16a in order to avoid tying up the computer.

In any case, the adder-subtracter comparator 16a is supplied with two whole word signals $R_d$, $M_d$ to supply a whole word output $E_d$. The comparator 16 subtracts one of the two input signals from the other and provides the difference, the output $E_d$, as an absolute magnitude. This error signal $E_d$ is applied to four exclusive-OR comparators 50, 52, 54, 56. As indicated in FIG. 2A, constants, $K_1$, $K_2$, $K_3$, $K_4$ are either set or fed into respective comparators 50, 52, 54, 56 for comparison with the value of the error signal $E_d$. These constants represent those error $E_d$ values at which it is desired to change the velocity of the motor 30. In this fashion, a velocity profile is built into this system. The constants are set such that $K_1$ is greater than $K_2$, $K_2$ is greater than $K_3$, and $K_3$ is greater than $K_4$. As indicated $K_4$ is set for the value "zero."

One of the output lines from each of the three exclusive-OR comparators 50, 52, 54 changes state when the error signal $E_d$ transitions from being greater than the predetermined constant $K_1$ involved to being equal to or less than the predetermined constant $K_1$. In the embodiment illustrated, the change of state is from a state where an output signal is supplied when $E_d$ is greater than the predetermined constant $K_1$ to a state where no output signal is provided as $E_d$ drops to equal to or less than the predetermined constant $K_1$ to a state where no output signal is fourth exclusive-OR comparator 56 is the one that represents the condition when the two values being compared are equal to one another. Thus the comparator 56 provides an output when $E_d$ equals zero.

When the error signal $E_d$ is greater than $K_1$ the exclusive-OR comparator 50 provides an output A which, as will be explained in connection with FIG. 2B, is used to cause the pattern generator 18a to cycle at its maximum rate.

When the magnitude of the error signal $E_d$ is greater than the constant $K_2$, the exclusive-OR comparator 52 provides an output which is fed to AND gate 62. When the magnitude of the digital error signal $E_d$ is equal to or less than the constant $K_1$, the output from the exclusive-OR comparator 50 drops. The inverter 63 then provides a second signal for the AND gate 62 so as to provide an output B. Thus, the output B is established only when the error signal $E_d$ is greater than $K_2$ and equal to or less than $K_1$.

A comparable analysis of the operation of the AND gate 64 and inverter 65 will show that the signal C is provided only when the error signal $E_d$ is greater than $K_3$ and equal to or less than $K_2$.

When $E_d$ is equal to or less than $K_3$, the comparator 54 output will drop and the inverter 67 will then provide an output, which output is the signal D.

In this fashion, four mutually exclusive signals A, B, C, D are provided. As described in connection with FIG. 2B, they determine separate pattern generator 18a output cycling rates as a function of error $E_d$ value ranges.

The AND gate 68 supplies a signal F when two conditions are met. The first is that the digital error $E_d$ is zero. The second is that the pattern generator 18a is at its predetermined output state. This second condition is represented by the notation $\Delta\theta=0$.

In connection with FIG. 2A, it might further be noted that outputs G, H and J are made available representing, respectively, the conditions when $E_d$ equals zero, $E_d$ is greater than zero and $E_d$ is less than zero. These three outputs are employed, as will be explained in connection with the description of FIG. 2C, to provide appropriate polarity indications to make sure that the control signal $E_c$ of the motor 30 functions to drive the motor 30 in the proper direction.

The outputs A, B, C, D and F from FIG. 2A are applied directly or indirectly to various AND gates shown in FIG. 2B. The output $f_o$ of the oscillator 38 is applied to the AND gate 72. As long as there is no output signal F, the inverter 70 will apply an enabling signal for the AND gate 72 and the oscillator output $f_o$ will be passed by the AND gate 72 and by virtue of successive application to the three J–K binary counters 74, 76 and 78 will provide four signals having the frequencies shown of $f_o$, $f_o/2$, $f_o/4$ and $f_o/8$. These four different frequencies are applied respectively to the AND gates 80, 82, 84 and 86. The enabling signals applied to these four AND gates are respectively the outputs D, C, B and A. Accordingly, the frequency of the signal applied to and through the OR gate 88 will depend upon the enabling signal A, B, C or D. The highest frequency $f_o$ will be made available when the digital error $E_d$ is greater than $K_1$. As the digital error $E_d$ drops below the value of $K_1$, the frequency made available at the output of the OR gate 88 will drop in stages at error signal $E_d$ values that correspond to the constants $K_1$, $K_2$, $K_3$.

The choice of the error $E_d$ value breaking point $K_1$, $K_2$, $K_3$ and the choice of the corresponding frequencies $f_o$, $f_o/2$, $f_o/4$, $f_o/8$ from the programmed frequency divider 36 is based on the dynamics of the load. An optimum condition exists when these break points and frequencies are chosen so that maximum velocity capability of the motor is used for minimum slewing time and, simultaneously, system overshoot around the zero digital error condition is held to a minimum.

The output F from FIG. 2A is applied to the inverter 70 in FIG. 2B and the inverter 70 output is applied to the AND gate 72. Consequently, this signal F, which represents the condition that the pattern generator has cycled to its final, non-cycling state when there is no digital error, is used to determine the state of the AND gate 72. When the condition that provides the signal F is met, the inverter 70 provides no enabling signal to the AND gate 72. Thus the oscillator 38 output $f_o$ is blocked from the rest of the circuit and the pattern generator 18a ceases cycling. In this fashion, the attainment of the joint condition that $E_d$ equals zero and $\Delta\theta$ equals zero results in stopping the pattern generator at the point where the condition is attained.

The pattern generator 18a is basically four J–K binary counters 90, 92, 94, 96. The input signal $f_p$ to the pattern generator 18a is a series of pulses. The binary counters 90, 92, 94, 96 change their output state each time a pulse is incident. If it is assumed that these binary counters operate off the trailing edge of the incoming pulses then a first pulse will cause the output of the binary 90 to go high. The second pulse will cause the output of the binary 90 to go low, thereby causing the output of the binary 92 to go high. The third pulse will cause the output of the binary 90 to go high, which will not change the output of the binary 92. The fourth pulse will cause the output of the binary 90 to go low thereby causing the output of the binary 92 to go low and causing the output of the binary 94 to go high. This last flip of the binary 94 will register the value four. In this fashion, the counters 90, 92, 94, 96 accumulate sixteen bits and provide a four bit simultaneous binary output which in effect counts the pulses that come along up to the magnitude of sixteen at which point the counter or accumulator arrangement starts all over. Thus the pattern generator 18a cycles through sixteen output patterns in a regular fashion, one complete cycle being made for each sixteen incoming pulses. The rate at which it cycles through these sixteen output patterns is determined by the frequency $f_p$ of the incoming signal.

The pattern generator 18a supplies a cycling four bit binary output which is applied to a four bit binary to sixteen line decimal converter 98 so as to provide a sixteen line output that can be converted to the desired and required sine and cosine signals by virtue of equipment such as that disclosed in FIG. 7 of my co-pending application, Control System, Ser. No. 729,846, now Pat. No. 3,462,663 filed Feb. 29, 1968.

Since the output from the converter 98 is a sixteen line decimal signal corresponding to and representing the sixteen states of the output of the pattern generator 18a, the frequency of the output of the digital to sine-cosine converter 40 will be 1/16 of the rate at which the converter 98 changes state. There will be a digital to sine-cosine converter 40 output which will have a frequency that will cause saturation velocity of the motor 30. It may be desired that this converter 40 output which will have a frequency that will cause saturation velocity of the motor 30. It may be desired that this converter 40 "saturation" output be achieved when the digital error signal $E_d$ is greater than $K_1$. In such case, the frequency $f_o$ of the oscillator 38 should be sixteen times the frequency of the converter 40 output that will cause saturation velocity of the motor 30. When the digital error $E_d$ is greater than $K_1$, the frequency $f_p$ of the divider 36 output will equal that of the oscillator 38 and will cause the pattern generator 18a to shift into successive states at a rate $f_o$. However, since sixteen successive states represent one cycle of the converter 40 output, the converter 40 output will be a frequency 1/16 that of the oscillator 38 output frequency $f_o$. After the digital error $E_d$ has dropped below $K_1$, the velocity imparted to the motor will decrease in accordance with the program described above.

An additional component of the pattern generator 18a is an exclusive-OR comparator 100 which is used to compare the four bit output $P_d$ with predetermined or programmed four bit word $\theta_c$. The comparator 100 provides three signals. A first signal, $\Delta\theta > 0$ indicates when the difference between $P_d$ and $\theta_c$ is positive. A second signal, $\Delta\theta = 0$ indicates when $P_d = \theta_c$. A third signal, $\Delta\theta < 0$ indicates when the difference between $P_d$ and $\theta_c$ is negative. The outputs from the exclusive-OR comparator 100 are then employed to provide proper indications of polarity, as described in connection with FIG. 2C.

In addition, the $\Delta\theta = 0$ output effectively serves to disable the AND gate 72, when $E_d$ also equals zero. When the pattern generator 18a has cycled to provide an output $P_d$ equal to that of the predetermined or pre-programmed value $\theta_c$, then the signal $\Delta\theta = 0$ will be applied to the AND gate 68 (see FIG. 2A). As long as $E_d$ does not equal zero this will have no effect. But when $E_d$ does equal zero and the pattern generator 18a has continued to cycle until $\Delta\theta = 0$, then the AND gate 68 will provide an output which will mean that the output of the inverter 70 will drop and the AND gate 72 thus disabled. As a consequence, the signal $f_p$ will cease being applied to the pattern generator 18a and the pattern generator 18a will cease cycling at the point where $\Delta\theta = 0$ and $E_d = 0$.

FIG. 2C indicates the means by which the polarity of the power to the motor 30 is determined. A polarity, to induce a clockwise rotation of the motor is desired, for example, (a) whenever $E_d > 0$ or (b) when $E_d = 0$ and $\Delta\theta > 0$. Similarly, a polarity that will provide a counter clockwise rotation is desired (a) whenever $E_d < 0$ or (b) when $E_d = 0$ and $\Delta\theta < 0$.

The proper polarity is achieved by means of determining the polarity of the drive signal applied to the motor 30 as a function of the two outputs of an A.C. coupled binary 102. When the CW output of the binary 102 is high, a control bridge to the motor 30 is biased to supply power in such a direction as to tend to cause clockwise rotation of the motor 30. When the CCW output of the binary 102 is high, the control bridge to the motor 30 is biased to supply power in such a direction as to tend to cause counter clockwise rotation of the motor 30. The A.C. binary 102 is a bi-stable device that is forced into one of its two stable output states CW, CCW as a function of which of two input terminals last received an input signal. In the embodiment shown, an output from the OR gate 104 will force the binary 102 into the state where its CW output is high and its CCW output is low. An input from the OR gate 106 will force the binary 102 into the state where its CW output is low and its CCW output is high. If the binary 102 is in a given state, for example the CW state, then the only way for it to change state is for it to receive an input from the OR gate 106.

In the FIG. 2C arrangement, whenever the digital error is negative, ($E_d < 0$) a signal on the line J will cause the binary 102 to be placed in its CCW state. Similarly, whenever the digital error is positive ($E_d > 0$) a signal on line H will force the binary 102 into its CW state. When $E_d = 0$ an ambiguous polarity situation might arise unless the additional circuitry shown in FIG. 2C is employed. It is true that when the system comes into the $E_d = 0$ condition there would normally be no reason why the state of the binary 102 should change. But when the pattern generator 18a has cycled to its predetermined stable output state (and thus $\Delta\theta$ and $E_d$ are both zero) there is the capability of modifying the command input $\theta_c$ to the exclusive-OR comparator 100 so as to cause the pattern generator 18a to cycle to a new stable output state. If such capability is employed, it is important that correct polarity be indicated. This is achieved by virtue of the two AND gates 108, 110. When the digital error $E_d$ equals zero the AND gates 108 and 110 are enabled. If the programmed input $\theta_c$ to the comparator 100 is varied so that $\Delta\theta$ is greater than zero, then an output from the AND gates 108 forces the binary 102 into its CW state. Similarly, if $\Delta\theta$ becomes less than zero, an output from the AND gate 110 forces the binary 102 into its CCW state.

The magnitude of the four bit word $\theta_c$ signifies the desired stopping position of the pattern generator 18a within the least significant bit of the encoder 32 digital output $M_d$ and thus provides additional control resolution over motor shaft angle position. This four bit word $\theta_c$ can be set as a predetermined fixed value into the pattern generator 18a. Alternately, this four bit command $\theta_c$ can be applied to the pattern generator 18a as an extension of the absolute reference signal $R_d$. In the latter case, a reference signal $R_d$ would be the digital command word of $(N+4)$ bits discussed above in connection with FIG. 2. Four bits of this $(N+4)$ word reference $R_d$ would constitute the $\theta_c$ command. These four bits are the $m$ bits of the $(N+m)$ bit reference signal $R_d$ illustrated in FIG. 2.

The command angle $\theta_c$ is shown as having four bit resolution. Obviously, part of the four bit command $\theta_c$ can be a fixed predetermined value in the pattern generator 18a and the rest (less than four bits) can be from additional bits in digital reference signal $R_d$.

What is claimed is:

1. In a control system adapted to control a parameter of a controlled system as a function of a digital command signal wherein the parameter being controlled is capable of being represented as the phase and frequency of the measurement signal, and wherein means are included to provide a digital first measurement signal of the parameter and a second measurement signal of the parameter wherein said second measurement signal has a frequency that deviates from a predetermined frequency as a function of the dynamic value of the parameter being controlled and has a phase representing the instantaneous value of the parameter being controlled, the improvement comprising:

a digital comparator coupled to said digital command signal and to said digital first measurement signal to provide a digital error signal representing the deviation of the parameter being controlled from the value being commanded, by said command signal, a digital to analog converter responsive to said digital error signal to provide a reference signal having a frequency that deviates from said predetermined frequency as a function of the magnitude of said digital error signal, said converter including means responsive to a zero value for said digital error signal for establishing the phase of said reference signal when said digital error signal has a zero, and comparator means responsive to said reference signal and to said second measurement signal to provide a control signal as a function of the phase difference between the two signals being compared therein, said control signal being adapted to control said parameter in said controlled system.

2. The control system of claim 1 wherein said digital to analog converter comprises:

a digital pattern generator having a $m$-bit digital output, said pattern generator being responsive to the magnitude of said digital error signal to cycle said $m$-bit digital output through its $2^m$ states at a rate that is a function of said digital error signal, and digital to analog converter means responsive to said $m$-bit digital signal to provide said reference signal.

3. The control system of claim 1 wherein:

said digital command signal includes a subsidiary digital command component, and wherein said means for establishing the phase of said reference signal is responsive to said subsidiary digital command component to provide control over the phase of said reference signal as a function of said subsidiary digital command component when said digital error signal has a zero value.

4. The control system of claim 2 wherein:

said digital command signal includes a subsidiary digital command component, and wherein said means for establishing the phase of said reference signal is responsive to said subsidiary digital command component when said digital error signal has a zero value to cause the output state of said digital pattern generator to be determined by said subsidiary digital command component when said digital error signal has a zero value.

5. The control system of claim 3 wherein:

said rate at which said output of said pattern generator cycles is stepped down to predetermined rates at predetermined decreasing digital error signal values to provide a control signal that is appropriately stepped down in magnitude as the parameter being controlled approaches the value commanded by said digital command signal.

6. The control system of claim 1 wherein said digital to analog converter comprise:

a variable frequency source responsive to the magnitude of said digital error signal to provide an output signal at a frequency that is a function of said magnitude of said digital error signal, a digital pattern generator to provide an $m$-bit digital output, said pattern generator being responsive to said frequency of said frequency source output signal to cycle said $m$-bit digital output through its $2^m$ states at a rate that is a function of said frequency of said frequency source output, and digital to analog converter means responsive to said $m$-bit digital signal to provide said reference signal.

7. The control system of claim 6 wherein:

said frequency of said frequency source output signal is stepped down to predetermined frequency values at predetermined decreasing digital error signal values to provide a control signal that is appropriately stepped down in magnitude as the parameter being controlled approaches the value commanded by said digital command signal.

8. The control system of claim 1 wherein said digital to analog converter comprises:

converter means responsive to said $m$-bit digital signal to convert said $m$-bit digital signal to an intermediate analog reference signal, an interrogating signal source to provide an interrogating signal, and first side band generator means responsive to said interrogating signal and to said intermediate analog reference signal to provide said reference signal having a side band relationship to said interrogating signal, whereby said predetermined frequency is the frequency of said interrogating signal.

9. The control system of claim 8 wherein:

said digital command signal includes a subsidiary digital command component, and wherein said means for establishing the phase of said reference signal is responsive to said subsidiary digital command component when said digital error signal has a zero value to cause the output state of said digital pattern generator to be determined by said subsidiary digital command component when said digital error signal has a zero value.

10. The control system of claim 1 wherein said parameter being controlled is the position and speed of a moveable element and wherein frequency and phase of said measurement signals represent, respectively, velocity and position of said moveable element.

11. A control system adapted to control a parameter in a controlled system as a function of a digital command signal, said parameter being capable of representation as the phase and frequency of a measurement signal, comprising:

first read-out means coupled to the controlled system to provide a digital first measurement signal of the parameter, digital comparator means for comparing said digital command signal and said digital first measurement signal to provide a digital error signal, a digital to analog converter responsive to said digital error signal to provide a reference signal having a frequency that deviates from a predetermined frequency as a function of the magnitude of said digital error signal; said converter including means for establishing the phase of said reference signal when said digital error signal has a zero value, means coupled to said controlled system to provide a second measurement signal having a frequency that deviates from said predetermined frequency as a function of the dynamic value of the parameter being controlled and having a phase representing the instantaneous value of the parameter being controlled, and comparator means for comparing the phase relationship between said reference and said second measurement signals to provide a control signal adapted to control said parameter in said controlled system.

12. The control system of claim 11 wherein said digital to analog converter comprises:

converter means responsive to said $m$-bit digital signal to converter said $m$-bit digital signal to an intermediate analog reference signal, an interrogating signal source to provide an interrogating signal, and first side band generator means response to said interrogating signal and to said intermediate analog reference signal to provide said reference signal having a side band relationship to said interrogating signal, whereby said predetermined frequency is the frequency of said interrogating signal.

13. The control system of claim 12 wherein:

said digital command signal includes a subsidiary digital command component, and wherein said means for establishing the phase of said reference signal is responsive to said subsidiary digital command component when said digital error signal has a zero value to cause the output state of said digital nal representing the magnitude of deviation of the parameter from the value being commanded, converting said digital error signal to a phase-analog reference signal having a frequency that deviates from a predetermined frequency as a function of the magnitude of said digital error signal, generating a phase-analog measurement signal having a frequency that deviates from said predetermined frequency as a function of the dynamic value of the parameter being controlled and having a phase representing the instantaneous value of the parameter being controlled, comparing said phase-analog measurement signal against said phase-analog reference signal to provide a control signal to drive said system in a direction tending to bring the magnitude of said parameter into correspondence with the value being commanded, and controlling the phase of said phase-analog reference signal when said digital error signal has a zero value.

17. The method of claim 16 wherein:
said digital command signal has a first command component and a second command component,
said first component is the command signal being compared with said digital measurement signal, and
said second component is employed to command said phase of said phase-analog reference signal when said digital error signal has a zero value.

pattern generator to be determined by said subsidiary digital command component when said digital error signal has a zero value.

14. The control system of claim 12 wherein said means coupled to said controlled system comprises:
second read-out means coupled to said controlled system to provide an intermediate analog measurement signal having a frequency and phase that is a function of the dynamic and static values, respectively, of the parameter being controlled, and
second side band generator means responsive to said interrogating signal and to said intermediate analog measurement signal to provide said second measurement signal having a side band relationship to said interrogating signal.

15. A control system for controlling a parameter, and its time derivative of a controlled system, wherein said controlled system provides a measurement signal having phase and frequency that is a function of said parameter and its time derivative, comprising:
means for generating an interrogation signal,
means for generating a measurement signal side band of said interrogation signal and for comparing said measurement signal side band with a reference signal to provide a control signal for said controlled system,
means for comparing a digital measurement signal of said parameter with a digital command signal to provide a digital reference signal, and
digital to analog converter means responsive to said digital reference signal and to said interrogation signal to provide said reference signal as a side band of said interrogation signal.

16. The method of controlling a parameter in a controlled system as a function of a digital command signal wherein said parameter is capable of being represented by the phase and frequency of a measurement signal and wherein a digital measurement signal of the parameter is provided, comprising the steps of:
comparing said digital measurement signal against said digital command signal to provide a digital error sig-

References Cited
UNITED STATES PATENTS

| | | |
|---|---|---|
| 2,743,362 | 4/1956 | Leed. |
| 2,819,438 | 1/1958 | Sant Angelo. |
| 3,098,186 | 7/1963 | Williamson et al. |
| 3,340,451 | 9/1967 | Farrand. |
| 3,462,663 | 8/1969 | Schiller. |

BENJAMIN DOBECK, Primary Examiner

U.S. Cl. X.R.

318—608

UNITED STATES PATENT OFFICE
CERTIFICATE OF CORRECTION

Patent No. 3,548,282               Dated   December 15, 1970

Inventor(s) Michael S. Schiller

It is certified that error appears in the above-identified patent and that said Letters Patent are hereby corrected as shown below:

Col. 1, line 61: "posiiton" should be --position--.

Col. 4, line 25: "multibit" should be --multi-bit--.

Col. 8, line 16: "phase analog" should be --phase-analog--.

Col. 8, line 17: "phase analog" should be --phase-analog--.

Col. 9, line 18: Delete the comma after "constants".

Col. 9, line 34: "$K_i$" should be --$K_1$--.

Col. 9, line 36: "$K_1$ to a state where no output signal is" should be --The output line employed from--.

Col. 10, line 55: After "pulses" insert a comma.

Col. 11, lines 16-18: After "30." delete entire sentence beginning with the word "It".

Col. 12, line 34: "gates" should be --gate--.

Col. 13, line 8: After "zero" insert --value--.

UNITED STATES PATENT OFFICE
CERTIFICATE OF CORRECTION

Patent No. 3,548,282     Dated December 15, 1970

Inventor(s) Michael S. Schiller     PAGE - 2

It is certified that error appears in the above-identified patent and that said Letters Patent are hereby corrected as shown below:

Col. 13, line 43: "claim 3" should be --claim 2--.

Signed and sealed this 4th day of January 1972.

(SEAL)
Attest:

EDWARD M. FLETCHER, JR.
Attesting Officer

ROBERT GOTTSCHALK
Acting Commissioner of Pate

FORM PO-1050 (10-69)